(12) United States Patent
Kim

(10) Patent No.: US 9,573,640 B2
(45) Date of Patent: Feb. 21, 2017

(54) BICYCLE PROVIDED WITH MOVABLE SADDLE

(71) Applicant: CREVEN Co., Ltd, Seoul (KR)

(72) Inventor: Choon Choo Kim, Seoul (KR)

(73) Assignee: CREVEN Co., Ltd, Seoul (KR)

( * ) Notice: Subject to any disclaimer, the term of this patent is extended or adjusted under 35 U.S.C. 154(b) by 27 days.

(21) Appl. No.: 14/388,809

(22) PCT Filed: Sep. 28, 2012

(86) PCT No.: PCT/KR2012/007884
§ 371 (c)(1),
(2) Date: Sep. 28, 2014

(87) PCT Pub. No.: WO2013/147375
PCT Pub. Date: Oct. 3, 2013

(65) Prior Publication Data
US 2015/0054319 A1    Feb. 26, 2015

(30) Foreign Application Priority Data

Mar. 27, 2012  (KR) .......................... 10-2012-0031070

(51) Int. Cl.
| | | |
|---|---|---|
| *B62J 1/00* | (2006.01) |
| *B62J 1/08* | (2006.01) |
| *B62K 19/36* | (2006.01) |
| *B62J 1/10* | (2006.01) |

(52) U.S. Cl.
CPC .. *B62J 1/08* (2013.01); *B62J 1/10* (2013.01); *B62K 19/36* (2013.01)

(58) Field of Classification Search
CPC .................................. B62J 1/08; B62K 19/36

USPC ........................................ 297/215.14, 215.13
See application file for complete search history.

(56) References Cited

U.S. PATENT DOCUMENTS

| | | | | |
|---|---|---|---|---|
| 4,502,811 A | * | 3/1985 | Patriarca ................... | B62J 1/08 297/215.14 |
| 5,007,675 A | * | 4/1991 | Musto ..................... | B62K 19/36 297/215.14 |
| 5,149,034 A | * | 9/1992 | Ganaja .................... | B62K 19/36 248/178.1 |

(Continued)

FOREIGN PATENT DOCUMENTS

| | | |
|---|---|---|
| KR | 20-2011-0001324 | 2/2011 |
| KR | 20-2011-0001325 | 2/2011 |

(Continued)

OTHER PUBLICATIONS

International Search Report and the Written Opinion Dated Feb. 1, 2014 From the Korean Intellectual Property Office Re. Application No. PCT/KR2012/007884 and Its Translation Into English.

*Primary Examiner* — David R Dunn
*Assistant Examiner* — Alexander Harrison

(57) ABSTRACT

The present invention relates to a bicycle provided with a movable saddle, which comprises: the movable saddle; a saddle moving module connected to the movable saddle and coupled with the seat post area of a bicycle frame so as to move the movable saddle in the direction of travel of the bicycle or in the opposite direction as a wire is pulled or pushed; and a control lever provided in the handle area of the bicycle, wherein the wire is bound thereto, for controlling the pulling or pushing of the wire.

9 Claims, 4 Drawing Sheets

(56) References Cited

U.S. PATENT DOCUMENTS

| | | | | | |
|---|---|---|---|---|---|
| 6,752,453 | B1* | 6/2004 | Yapp | | B62J 1/08 248/298.1 |
| 7,267,401 | B2* | 9/2007 | Bertelloni | | B62J 1/08 297/195.1 |
| 7,380,629 | B2* | 6/2008 | Vaisanen | | B62J 1/12 180/190 |
| 7,621,595 | B1* | 11/2009 | Chen | | B62J 1/08 297/215.13 |
| 7,628,451 | B2* | 12/2009 | Chuang | | B62J 1/005 297/201 |
| 7,762,931 | B2* | 7/2010 | Fisher | | B62J 1/08 297/215.14 |
| 8,424,963 | B2* | 4/2013 | Kim | | B62J 1/08 297/215.13 |
| 2006/0006707 | A1* | 1/2006 | Lin | | B62J 1/08 297/215.14 |
| 2006/0175792 | A1* | 8/2006 | Sicz | | B62J 1/06 280/200 |
| 2007/0182225 | A1* | 8/2007 | Bigolin | | B62J 1/08 297/215.13 |
| 2008/0315653 | A1* | 12/2008 | Brunner | | B60N 2/4832 297/362 |
| 2009/0102252 | A1* | 4/2009 | Geyer | | B62J 1/00 297/215.13 |
| 2010/0187873 | A1* | 7/2010 | Geyer | | B62J 1/00 297/215.13 |
| 2010/0327641 | A1* | 12/2010 | Schranz | | B62K 19/36 297/215.13 |
| 2012/0112503 | A1* | 5/2012 | Masutani | | B60N 2/42754 297/216.1 |
| 2015/0191111 | A1* | 7/2015 | Marini | | B60N 2/464 297/411.3 |

FOREIGN PATENT DOCUMENTS

| | | |
|---|---|---|
| KR | 10-1124016 | 3/2012 |
| WO | WO 2013/147375 | 10/2013 |

\* cited by examiner

BICYCLE PROVIDED WITH MOVABLE SADDLE

RELATED APPLICATIONS

This application is a National Phase of PCT Patent Application No. PCT/KR2012/007884 having International filing date of Sep. 28, 2012, which claims the benefit of priority of Korean Patent Application No. 10-2012-0031070 filed on Mar. 27, 2012. The contents of the above applications are all incorporated by reference as if fully set forth herein in their entirety.

TECHNICAL FIELD

The present invention relates to a bicycle provided with a movable saddle, and more particularly, to a bicycle provided with a movable saddle with which it is possible to easily change a position of the saddle to be suitable for body sizes of riders even during moving without inconvenience even when the riders have different body sizes by moving the saddle in a moving direction of the bicycle or an opposite direction thereto.

BACKGROUND ART

In general, bicycles move forward by rotating wheels with power generated when a person steps on pedals with his or her feet.

The bicycles include three-wheeled vehicles, four-wheeled bicycles, and bicycles for water or ice which move in places other than the ground.

The bicycles are representative means of transportation that use power by a person, and have been widely used. In recent years, the bicycles have been used for various applications such as means for promoting health as exercise equipment and means for enjoying recreation. Further, there is an increasing demand for the bicycles due to their environment-friendly characteristics.

FIG. 1 is a perspective view of a bicycle according to the related art.

Referring to FIG. 1, a general bicycle 1 includes wheels 2, frame 3, pedals 4, a chain 5, a fixed saddle 6, and a handle 7. In this case, the fixed saddle 6 on which a rider sits is fixed to a seat post 8 as a vertical shaft of a frame 3.

As stated above, in the bicycle 1 according to the related art, since the fixed saddle 6 is fixed to the seat post 8 in most cases, the fixed saddle 6 is not moved in a moving direction of the bicycle 1 or an opposite direction thereto.

However, unlike the bicycle according to the related art, if the fixed saddle 6 can be moved in the moving direction of the bicycle 1 or the opposite direction thereto, it is possible to easily change a position of the saddle 6 to be suitable for body sizes of users of the bicycle 1 even during moving without inconvenience even when the users have different body sizes.

DISCLOSURE

Technical Problem

An object of the present invention is to provide a bicycle provided with a movable saddle with which it is possible to easily change a position of the saddle to be suitable for body sizes of riders even during moving without inconvenience even when the riders have different body sizes by moving the saddle in a moving direction of the bicycle or an opposite direction thereto.

Technical Solution

In order to achieve the above object, there is provided a bicycle provided with a movable saddle including a movable saddle, a saddle moving module that is connected to the movable saddle to be coupled to a region of a seat post of a bicycle frame, and pulls or pushes wires to move the movable saddle in a moving direction of a bicycle or an opposite direction thereto, and a control lever that is provided in a region of a handle of the bicycle frame to allow the wires to be bound, and operates the wire to be pulled or pushed.

The saddle moving module may include a module box that forms an external appearance, a wire connection shaft whose central region is fixed to a saddle bracket extending from the movable saddle and both ends are exposed to the outside of the module box to be connected to the wires, rotational shafts that are rotatably coupled to the saddle bracket, pinions that are provided at both ends of the rotational shafts, racks that are provided within the module box to form lines that engage with the pinions to move.

The rotational shafts may be paired and disposed back and forth with the wire connection shafts interposed therebetween, and the pinions may be respectively provided at both end regions of the rotational shaft.

The wire connection shaft may be exposed to the outside through elongated holes formed in side surfaces of the module box, and wire binding brackets that bind the wires are further provided at ends of the wire connection shaft.

The bicycle may further include a wire force control unit that is connected to the saddle moving module to control force of the wires.

The wire may include a first wire that is connected to the control lever, and a second wire that is connected to the wire binding bracket. The wire force control unit may be connected to the first wire and the second wire.

The wire force control unit may include a unit housing, and a rotation bar that is provided within the unit housing, that moves in a seesaw motion by a pivot section, and whose one end serves as a first wire connection section connected to the first wire and the other end serves as a second wire connection section connected to the second wire.

A distance between the first wire connection section and the pivot section may be larger than a distance between the second wire connection section and the pivot section, and action directions of the first wire connected to the first wire connection section and the second wire connected to the second wire connection section may be parallel to each other.

The wire force control unit may further include a guide member that is disposed around the rotation bar, is rotatably coupled to the unit housing by a rotational shaft, and guides the second wire.

The wire force control unit may be connected to the bicycle frame.

Effect of the Invention

According to the present embodiment, it is possible to easily change a position of a saddle to be suitable for body sizes of riders even during moving without inconvenience even when the riders have different body sizes by moving the saddle in a moving direction of a bicycle or an opposite direction thereto.

DESCRIPTION OF MAIN REFERENCE NUMERALS OF DRAWINGS

| | |
|---|---|
| 102: Wheel | 103: Frame |
| 104: Pedal | 105: Chain |
| 107: Handle | 110: Movable saddle |
| 111: Saddle bracket | 120: Control lever |
| 130: Saddle moving module | 131: Module box |
| 132: Elongated hole | 133: Wire connection shaft |
| 134: Wire binding bracket | 135a, 135b: Rotational shaft |
| 137: Pinion | 138: Rack |
| 140: Wire | 160: Wire force control unit |

BEST MODE

Hereinafter, the present invention will be described in detail in conjunction to preferred embodiments of the present invention with reference to the accompanying drawings.

Figure 2:
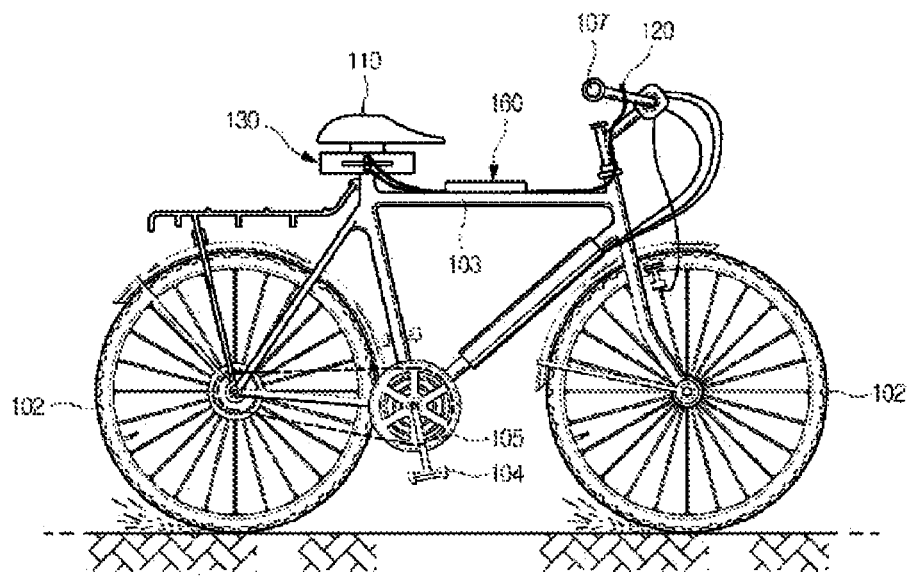
FIG. 2 is a side structure diagram of a bicycle provided with a movable saddle according to an embodiment of the present invention.
Figure 3:
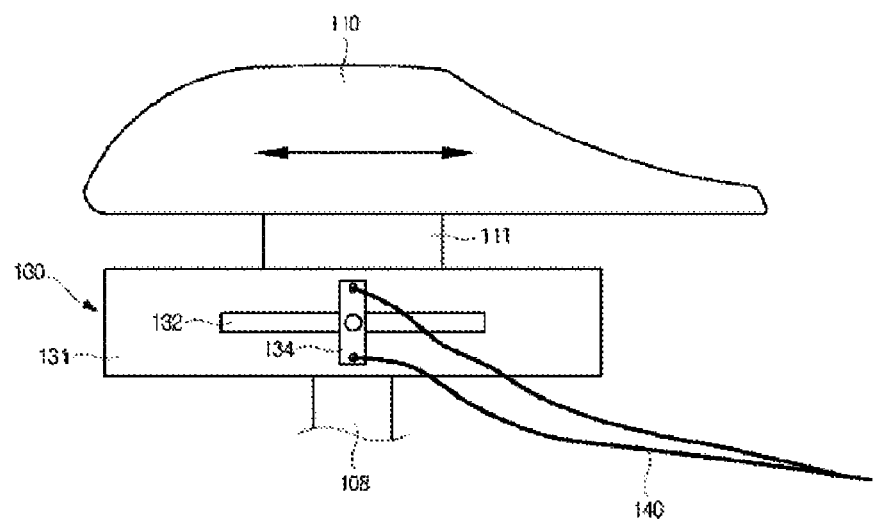
FIG. 3 is an enlarged view showing a region of the movable saddle shown in FIG. 2.
Figure 4:
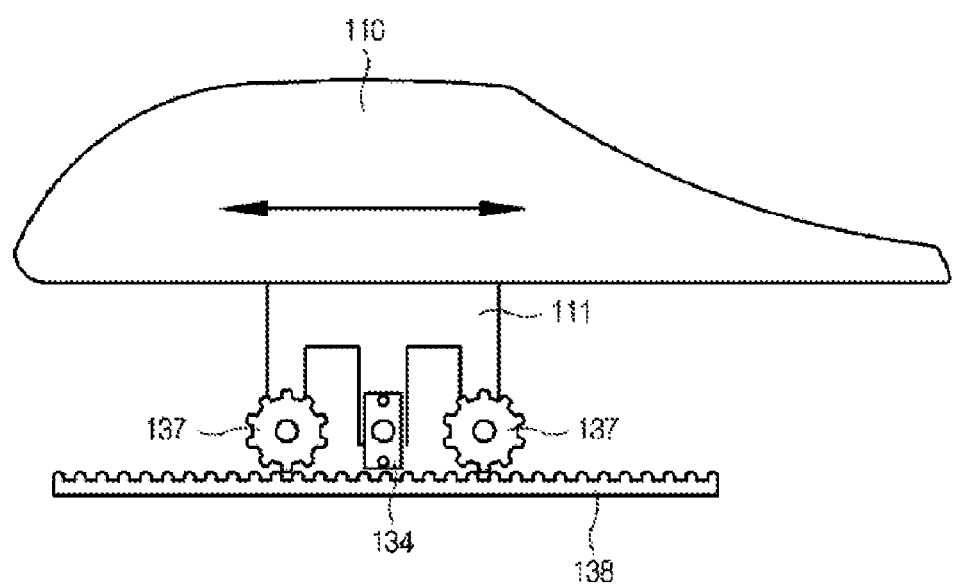
FIG. 4 is a side internal structure diagram schematically showing a saddle moving module.
Figure 5:
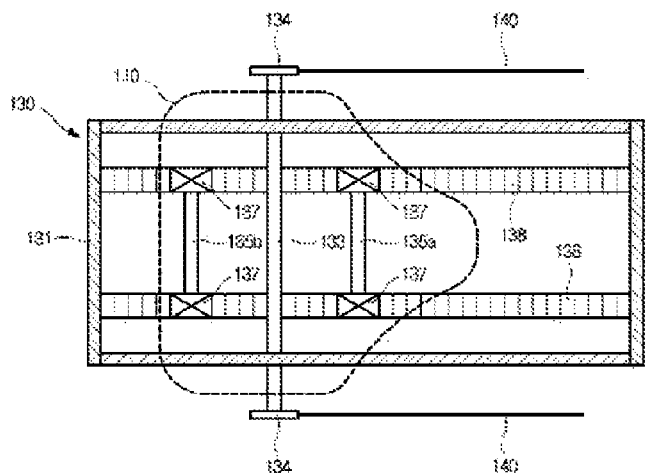
FIG. 5 is a plan internal structure diagram schematically showing the saddle moving module.
Figure 6:
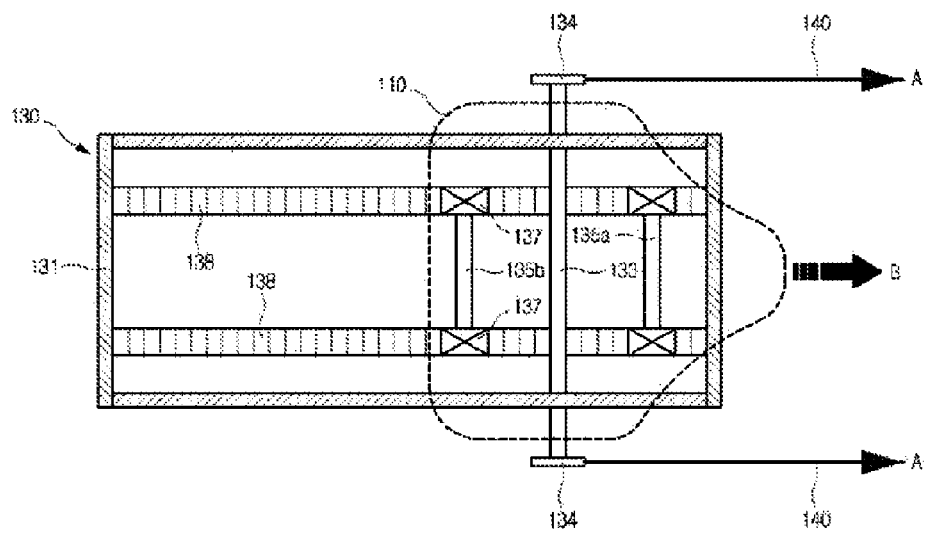
FIG. 6 is a diagram showing a state where the movable saddle is moved in a moving direction of the bicycle from the state shown in FIG. 5.

FIG. 2 is a side structure diagram of a bicycle provided with a movable saddle according to an embodiment of the present invention, FIG. 3 is an enlarged view showing a region of the movable saddle shown in FIG. 2, FIG. 4 is a side internal structure diagram schematically showing a saddle moving module, FIG. 5 is a plan internal structure diagram schematically showing the saddle moving module, and FIG. 6 is a diagram showing a state where the movable saddle is moved in a moving direction of the bicycle from the state shown in FIG. 5.

Referring first to FIG. 2 of the drawings, a bicycle of the present embodiment also includes wheels 102, a frame 103, pedals 104, a chain 105, and a handle 107, similarly to the bicycle according to the related art.

In addition, the bicycle of the present embodiment includes a movable saddle 110, a saddle moving module 130, and a control lever 120.

Figure 1:
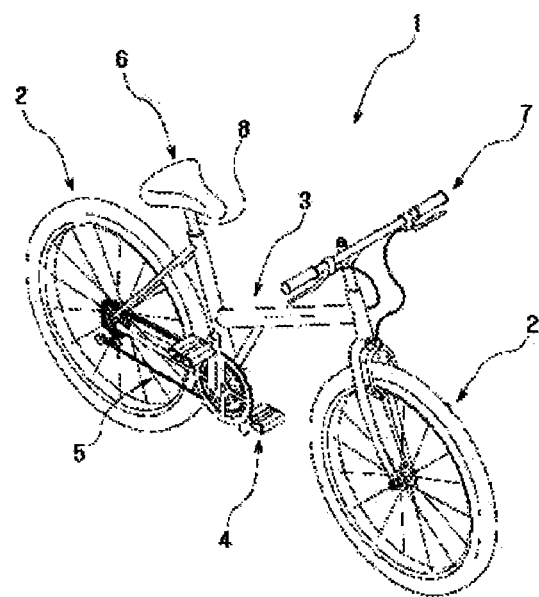
FIG. 1 is a perspective view of a bicycle according to the related art.

Unlike the fixed saddle 6 (see FIG. 1) according to the related art, especially in the present embodiment, the movable saddle 110 is used, and can be moved in a moving direction of the bicycle or an opposite direction thereto on the basis of an operation of the saddle moving module 130 caused by controlling the control lever 120. Accordingly, a position of the saddle can be easily changed to be suitable for a body size of a rider.

As shown in FIGS. 5 and 6, the movable saddle 110 has elasticity as a whole, and a top surface thereof is flat. A back side of the movable saddle has a large area so as to support the hips of the rider, and a front side thereof has a small area to be located between legs of the rider. Accordingly, there is no inconvenience even in riding for a long time.

The saddle moving module 130 is connected to the movable saddle 110 to be coupled to a region of a seat post 108 of the bicycle frame 103, and pulls or pushes wires 140 to move the movable saddle 110 in the moving direction of the bicycle or the opposite direction thereto.

Actually, the movable saddle 110 can be moved in both of the moving direction of the bicycle and the opposite direction thereto by the saddle moving module 130, but it will be described in the present embodiment that the movable saddle 110 is moved in the moving direction of the bicycle, as shown in FIGS. 5 and 6. However, the scope of the present invention is not limited to the aforementioned example.

As shown in FIG. 2, the control lever 120 is a part that is provided in a region of the handle 107 of the bicycle to allow the wires 140 to be bound, and operates the wires 140 to be pulled or pushed. In the present embodiment, the wires 140 can be pulled by the control lever 120.

Meanwhile, as shown in FIGS. 3 to 6, the saddle moving module 130 includes a module box 131, a wire connection shaft 133, and rotational shafts 135a and 135b.

The module box 131 forms an external appearance of the saddle moving module 130. Although the module box 131 is very schematically illustrated in the drawings, a shape of the module box 131 may be appropriately changed to be suitable for the bicycle. Since the wire connection shaft 133 and the rotational shafts 135a and 135b are not seen from the outside due to the module box 131, the bicycle can have a good external appearance.

A central region of the wire connection shaft 133 is fixed to a saddle bracket 111 extending from the saddle 110, and both ends thereof are exposed to the outside of the module box 131 to be connected to the wires 140.

In this case, the wire connection shaft 133 is exposed to the outside through elongated holes 132 formed in side surfaces of the module box 131, and wire binding brackets 134 for binding the wires 140 are provided at ends of the wire connection shaft 133. Consequently, the movable saddle 110 can be moved along with the operation of the wire connection shaft 133 moving along the elongated holes 132 formed in the side surfaces of the module box 131.

The rotational shafts 135a and 135b are rotatably connected to the saddle bracket 111. In the present embodiment, the rotational shafts 135a and 135b are paired and disposed back and forth with the wire connection shaft 133 interposed therebetween.

Pinions 137 are provided at both ends of the rotational shafts 135a and 135b, and racks 138 serve as lines that engage with the pinions 137 to move are provided within the module box 131.

An operation of the movable saddle 110 having such a configuration will be described with reference to FIGS. 5 and 6.

When a user controls the control lever 120, the wires 140 are pulled in a direction indicated by arrow A of FIG. 6, and such force is exerted to the wire connection shaft 133 through the wire binding brackets 134.

Accordingly, the movable saddle 110 can be moved in a direction indicated by arrow B, and in this case, the movable saddle 110 can be moved in the direction indicated by arrow B on the basis of the operation of the pinions 137 provided at the both ends of the rotational shafts 135a and 135b rotating along the racks 138.

Meanwhile, in order to return the movable saddle 110 to an original position, the user gets off the movable saddle 110, and forcibly pushes the movable saddle 110 backward.

As described above, according to the present embodiment, since the movable saddle 110 is moved in the moving direction of the bicycle or the opposite direction thereto, it is possible to easily change the position of the movable saddle 110 to be suitable for body sizes of riders even during the moving without inconvenience even when the riders have different body sizes.

Figure 7:
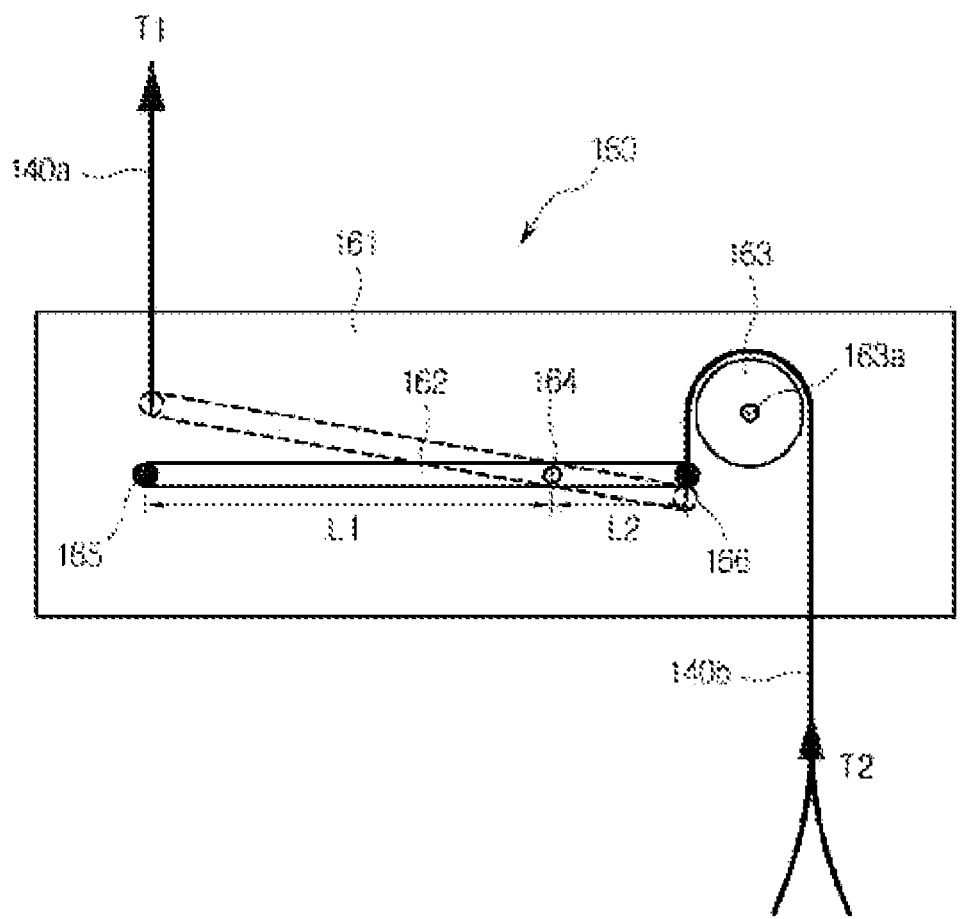
FIG. 7 is a plan structure diagram schematically showing a wire force control unit applied to the bicycle provided with a movable saddle according to the embodiment of the present invention.

FIG. 7 is a plane structure diagram schematically showing a wire force control unit applied to the bicycle provided with a movable saddle according to the embodiment of the present invention.

In the aforementioned embodiment, the movable saddle 110 is moved by controlling the control lever 120 to pull or push the wires 140. In this case, if force of the wires is reduced, it is possible to increase convenience for use. That is, it is possible to more easily move the movable saddle 110 with less force.

To achieve this, in the present embodiment, a wire force control unit 160 may be provided. Naturally, the wire force control unit 160 is merely an example, and is not necessarily provided.

The wire force control unit 160 is connected to the saddle moving module 130 to control the force of the wires 140.

Each of the wires 140 is divided into a first wire 140a connected to the control lever 120 and a second wire 140b connected to the wire binding bracket 134, and the wire force control unit 160 having a shape shown in FIG. 7 is disposed between the first wire 140a and the second wire 140b.

Naturally, the first wire 140a and the second wire 140b are not cut from each other, and since the wire force control unit 160 is connected between the first wire 140a and the second wire 140b, the first wire 140a and the second wire 140b is formed as a single line through the wire force control unit 160.

Meanwhile, the wire force control unit 160 is provided to reduce large force exerted when the first wire 140a is pulled by the control lever 120 and to exert large force to the wire binding brackets 134.

As shown in FIG. 2, the wire force control unit 160 may be provided at the frame 103, or may be disposed at another position.

Further, unlike the example shown in FIG. 2, when wire force control units 160 are connected in parallel to use, that is, when two or more wire force control units are used, it is possible to exert large force to the wire binding brackets 134 even though the first wire 140a is pulled or pushed with less force.

As shown in FIG. 7, the wire force control unit 160 having such a function includes a unit housing 161, a rotation bar 162 that is provided within the unit housing 161, that moves in a seesaw motion by a pivot section 164, and whose one end serves as a first wire connection section 165 connected to the first wire 140a and the other end serves as a second wire connection section 166 connected to the second wire 140b, and a guide member 163 that is disposed around the rotation bar 162 to guide the second wire 140b.

Both of the first wire connection section 165 and the second wire connection section 166 may be rotatably connected to both ends of the rotation bar 162.

The wire force control unit 160 is a unit that uses the so-called principle of the lever. In the present embodiment, the wire force control unit is provided to reduce large force exerted when the first wire 140a is pulled and to exert large force to the wire binding brackets 134 pulling the movable saddle 110.

That is, referring to FIG. 7, the product of a distance L1 from the pivot section 164 to the first wire connection section 165 and magnitude T1 of the force exerted when the first wire connection section 165 is pulled, that is, magnitude T1 of the force exerted when the first wire 140a is pulled is equal to the product of a distance L2 from the pivot section 164 to the second wire connection section 166 and magnitude T2 of the force exerted when the second wire 140b connected to the second wire connection section 166 is pulled. Accordingly, it is possible to further reduce the exerted force by appropriately adjusting a position of the pivot section 164.

For example, as shown in FIG. 7, when the distance L1 between the first wire connection section 165 and the pivot section 164 is larger than the distance L2 between the second wire connection section 166 and the pivot section 164, it is possible to reduce large force exerted when the first wire 140a is pulled and to exert large force to the wire binding brackets 134 pulling the movable saddle 110 due to the so-called principle of the lever. In this case, it is advantageous to allow action directions of the first wire 140a connected to the first wire connection section 165 and the second wire 140b connected to the second wire connection section 166 to be parallel to each other.

The guide member 163 is a discus-shaped member that guides the second wire 140b and is disposed around the rotation bar 162. The guide member may be rotatably connected to the unit housing 161 by a rotational shaft 163a.

As described above, by providing the wire force control unit 160 that controls the force of the wires 140 between the saddle moving module 130 and the control lever 120, it is possible to conveniently adjust the position of the saddle 110 with less force while the rider sits on the saddle 110.

The present invention is not limited to the above-described embodiment, and it should be apparent to those skilled in the art that the embodiment can be modified and changed in various manners without departing the concept and scope of the present invention. Therefore, it would be appreciated that the modifications and changes are included in the claims of the present invention.

What is claimed is:

1. A bicycle provided with a movable saddle, comprising:
a movable saddle;
a saddle moving module that is connected to the movable saddle to be coupled to a region of a seat post of a bicycle frame, and pulls or pushes a plurality of wires to move the movable saddle in a moving direction of a bicycle or an opposite direction thereto; and
a control lever that is provided in a region of a handle of the bicycle frame to allow the plurality of wires to be bound, and operates the plurality of wires to be pulled or pushed,
wherein the saddle moving module includes:
a module box that forms an external appearance on an outside thereof;
a wire connection shaft having two ends and a central region, wherein said central region is fixed to a saddle bracket extending from the movable saddle and said two ends are exposed to the outside of the module box to be connected to the plurality of wires;

rotational shafts having two ends respectively and being rotatably coupled to the saddle bracket;

pinions that are provided at said two ends of the rotational shafts; and racks that are provided within the module box to form lines that engage with the pinions to move.

2. The bicycle provided with a movable saddle according to claim 1, wherein the rotational shafts are paired and disposed with said wire connection shaft interposed therebetween, and the pinions are respectively provided at said two ends of respective rotational shafts.

3. The bicycle provided with a movable saddle according to claim 1, wherein the wire connection shaft is exposed to the outside through elongated holes formed in side surfaces of the module box, and wire binding brackets that bind the plurality of wires are further provided at ends of the wire connection shaft.

4. The bicycle provided with a movable saddle according to claim 3, further comprising a wire force control unit that is connected to the saddle moving module to control force of the plurality of wires.

5. The bicycle provided with a movable saddle according to claim 4, wherein the plurality of wires includes:

a first wire that is connected to the control lever; and a second wire that is connected to the wire binding brackets and wherein the wire force control unit is connected to the first wire and the second wire.

6. The bicycle provided with a movable saddle according to claim 5, wherein the wire force control unit includes:

a unit housing; and a rotation bar that is provided within the unit housing, that moves in a seesaw motion by a pivot section, and whose one end serves as a first wire connection section connected to the first wire and the other end serves as a second wire connection section connected to the second wire.

7. The bicycle provided with a movable saddle according to claim 6, wherein a distance between the first wire connection section and the pivot section is larger than a distance between the second wire connection section and the pivot section, and action directions of the first wire connected to the first wire connection section and the second wire connected to the second wire connection section are parallel to each other.

8. The bicycle provided with a movable saddle according to claim 6, wherein the wire force control unit further includes a guide member that is disposed around the rotation bar, is rotatably coupled to the unit housing by a rotational shaft, and guides the second wire.

9. The bicycle provided with a movable saddle according to claim 4, wherein the wire force control unit is connected to the bicycle frame.

* * * * *